United States Patent
Michel et al.

(10) Patent No.: US 8,565,807 B2
(45) Date of Patent: Oct. 22, 2013

(54) TRANSMISSION OF A SYNCHRONIZATION SIGNAL WITHIN A CELLULAR TELECOMMUNICATION NETWORK WITH TEMPORARILY INCREASED TRANSMITTING POWER

(75) Inventors: Juergen Michel, Munich (DE); Bernhard Raaf, Neuried (DE); Alexander Vesely, Feldbach (AT)

(73) Assignee: Nokia Siemens Networks Oy, Espoo (FI)

( * ) Notice: Subject to any disclaimer, the term of this patent is extended or adjusted under 35 U.S.C. 154(b) by 465 days.

(21) Appl. No.: 13/058,600

(22) PCT Filed: Aug. 13, 2009

(86) PCT No.: PCT/EP2009/060507
§ 371 (c)(1),
(2), (4) Date: Mar. 21, 2011

(87) PCT Pub. No.: WO2010/018212
PCT Pub. Date: Feb. 18, 2010

(65) Prior Publication Data
US 2011/0190027 A1  Aug. 4, 2011

(30) Foreign Application Priority Data

Aug. 13, 2008 (EP) .................................. 08105037

(51) Int. Cl.
*H04B 7/00* (2006.01)
(52) U.S. Cl.
USPC ............... 455/522; 455/502; 455/69; 455/70; 455/443; 455/444; 370/315; 370/316; 370/317; 370/318; 370/319
(58) Field of Classification Search
USPC ............. 455/522, 69–70, 502, 443–444, 500; 370/315–320, 310, 311, 324
See application file for complete search history.

(56) References Cited

U.S. PATENT DOCUMENTS

| | | | |
|---|---|---|---|
| 8,301,081 B2 * | 10/2012 | Aboba et al. ................. | 455/41.2 |
| 2004/0005890 A1 * | 1/2004 | Holma et al. ................. | 455/424 |
| 2007/0213086 A1 * | 9/2007 | Claussen et al. ............. | 455/513 |
| 2008/0039141 A1 | 2/2008 | Claussen et al. ............. | 455/561 |
| 2008/0207209 A1 * | 8/2008 | Katori et al. ................. | 455/447 |

(Continued)

OTHER PUBLICATIONS

S5-081171, 3 GPP TSG-SA5 (Telecon Management) Meeting SA5#60, Jul. 7-11, 2008, Sophia Antipolis, France, "Automatic Physical Cell ID Assignment", Nokia Siemens Network, 5 pgs.
R3-082185, 3 GPP TSG-RAN WG3 Meeting #61, Jeju, South Korea, Aug. 18-22, 2008, "Automatied Configuration of Physical Cell Identity", Nokia Siemens Networks, Nokia Corporation, 3 pgs.

(Continued)

*Primary Examiner* — Fayyaz Alam
(74) *Attorney, Agent, or Firm* — Harrington & Smith

(57) ABSTRACT

It is described a method for transmitting a synchronization signal within a cellular telecommunication network. The method includes activating a first base station of the cellular telecommunication network, informing at least one second base station, which is a potentially interfering base station with respect to the first base station, about the activation of the first base station, and broadcasting the synchronization signal by the at least one second base station with a temporarily increased transmitting power. It is further described a second base station for transmitting a synchronization signal to another base station of the cellular telecommunication network and a central network element, which is adapted to prompt a base station in order to transmit a synchronization signal. Furthermore, it is described a program element, which is adapted for controlling the described synchronization signal transmitting method.

15 Claims, 1 Drawing Sheet

(56) References Cited

U.S. PATENT DOCUMENTS

2009/0042596 A1* 2/2009 Yavuz et al. .................. 455/522
2009/0124205 A1* 5/2009 Aboba et al. ................. 455/63.1
2010/0029211 A1* 2/2010 Teague ........................ 455/63.1

OTHER PUBLICATIONS

R3-080812, 3 GPP TSG-RAN WG3 Meeting #59-bis, Shenzen, China, Mar. 31-Apr. 3, 2008, "Solution(s) to the 36.902's Automated Configuration of Physical Cell Identy Use Case", Nokia Siemens Networks, Nokia, 7 pgs.

* cited by examiner

TRANSMISSION OF A SYNCHRONIZATION SIGNAL WITHIN A CELLULAR TELECOMMUNICATION NETWORK WITH TEMPORARILY INCREASED TRANSMITTING POWER

FIELD OF INVENTION

The present invention generally relates to the field of operating cellular telecommunication networks. In particular, the present invention relates to a method for transmitting a synchronization signal between different base stations of a cellular telecommunication network. Further, the present invention relates to a base station for transmitting a synchronization signal to another base station of the cellular telecommunication network. Furthermore, the present invention relates to a central network element, which is adapted to prompt a base station in order to transmit a synchronization signal to another base station. Furthermore, the present invention relates to a program element, which is adapted for controlling the above described synchronization signal transmitting method.

ART BACKGROUND

Different base stations of a cellular telecommunication network need to have different physical Cell IDs assigned in downlink in order to avoid scrambling code collisions. A scrambling code collision would occur if two neighboring cells use the same scrambling code, which typically has a one-to-one relation to the Cell ID. In case of a scrambling code collision the signals from different base stations cannot be distinguished by a user equipment (UE) or at least the signals originating from different base stations cause a strong interference that is not averaged out due to different scrambling codes. In the worst case a UE detects the signal from the other base station rather than the signal from the own serving base station.

The problem of scrambling code collisions can also occur in connection with home base stations. In connection with Long Term Evolution (LTE) telecommunication networks a home base station is often called a Home evolved NodeB (HeNB). In connection with Universal Mobile Telecommunication Network (UMTS) a home base station is often called a Home NodeB (HNB). Such a HeNB can span a typically small home cell within the overlaying Wide Area (WA) telecommunication network. A small home cell is often referred to as a femto cell.

When setting up a new base station within a cellular telecommunication network a proper network planning has to be accomplished in order to avoid an assignment of the same Physical (cell) ID respectively the same scrambling code in particular to neighboring base stations or to base stations, which are situated comparatively close to each other.

The simplest method for assigning Physical Cell ID's consists of randomly selecting the physical ID of the base stations among available values. In case of a LTE telecommunication network 504 different values are provided by the current LTE standard specification. However, such a random selection method may lead to serious problems caused by scrambling code collisions in particular if the number of deployed base stations is high.

The publication "*Solution(s) to the 36.902's Automated Configuration of Physical Cell Identity Use Case*", R3-080812, *presented at the 3GPP TSG-RAN WG3 Meeting #59-bis* in Shenzen, China, 31 Mar.-3 Apr. 2008 discloses different solutions for the physical cell ID selection procedure for wide area networks. Therein, also so called Self Organizing Networks (SON) are described, wherein during deployment of a plurality of base stations proper physical ID's are automatically assigned to the base station in order to avoid scrambling code collisions.

In connection with home base stations, which are deployed or which are simply only activated within the spatial coverage of a WA cellular telecommunication network, one straightforward approach for allocating proper physical cell ID's is that UEs connected to the home base station report to the home base station which codes are used for neighbor home base stations and probably also for WA base stations. However, then the home base station is assumed to be already at least partially in operation. This implies that the home base station already has selected at least an intermediary scrambling code. In case of collisions after receiving UE measurement reports of course a reconfiguration of the corresponding base station would be needed.

Another approach for allocating proper physical cell ID's is based on the fact that many home base stations have an integrated UE like receiver. During an initial setup phase of the home base station and before fully activating the home base station, the UE like receiver scans the radio environment for neighboring home base stations and WA base stations. Based on the primary and secondary synchronization signals of these base stations an appropriate physical ID respectively an appropriate scrambling code for the respective home base station can be evaluated. However, this approach has the disadvantage that a UE connected to the home base station, which has been activated or which is supposed to be activated, might receive different neighboring home base stations or even different WA base stations depending on the position of the UE in the spatial range of the home base station.

The allocation of an appropriate physical ID respectively an appropriate scrambling code to an activated home base station or WA base station can also be carried out based on synchronization information, which is exchanged by means of suitable synchronization signals between different base stations. Therefore, when improving the transmission and/or the reception of synchronization signals the allocation of appropriate physical ID's respectively scrambling codes could also be improved.

There may be a need for improving the transmission of synchronization signals within a cellular telecommunication network.

SUMMARY OF THE INVENTION

This need may be met by the subject matter according to the independent claims. Advantageous embodiments of the present invention are described by the dependent claims.

According to a first aspect of the invention there is provided a method for transmitting a synchronization signal within a cellular telecommunication network. The described method comprises (a) activating a first base station of the cellular telecommunication network, (b) informing at least one second base station, which is a potentially interfering base station with respect to the first base station, about the activation of the first base station, and (c) broadcasting the synchronization signal by the at least one second base station with a temporarily increased transmitting power.

The described synchronization signal transmission method is based on the idea that by temporarily increasing the transmitting power for a synchronization signal after a new base station has been activated, the spatial coverage for receiving the temporarily increased synchronization signal can be enlarged significantly. Thereby, also a base station might be able to receive the synchronization signal, which otherwise, i.e. with a usual transmitting power, would not be able to receive the synchronization signal, and which nevertheless may represent an interfering base station for a user equipment (UE), which in the future will be served by the second base station. Such a situation can appear for instance if (a) the UE has a good radio connection with both the activated first base station and the second base station and (b) there is no or only a very bad radio connection between the first base station and the second base station. This can be the case for instance if the there is a barrier between the first base station and the second base station, but this barrier does not affect the radio connection to the UE, e.g. because the UE is not located behind that barrier. Due to the temporarily increased transmission power the synchronization signal may penetrate barriers such as house walls or other elements which at least partially attenuate radio signals.

Temporarily increasing the transmitting power may mean that after the transmission of the synchronization signal has been completed, which is related to the above described activation of the first base station, the transmission of further synchronization signals will be accomplished again with a usual transmission power.

The transmission of the synchronization signal with an increased transmission power can be interpreted as a power boosting, which will of course also produce enlarged interference effects with other radio signals being transmitted within the cellular telecommunication network. However, since it is not expected that the described synchronization signal transmitting method will be carried out very often within a predetermined time interval, this disadvantage can be tolerated.

In order to mitigate the influence of an increased interference between the power boosted synchronization signal and other radio data signals representing a part of the overall user data traffic, the collective synchronization power boost may be controlled by the cellular telecommunication network. For instance, if a Home enhanced Node B (H(e)NB) is in its initial setup phase, it signals to the network (e.g. to a gateway) that a power boost of the synchronization signals transmitted by the neighboring base stations should be accomplished.

The user equipment (UE) may be any type of communication end device, which is capable of connecting (a) with an arbitrary telecommunication network access point such as the first and/or the second base station. The first and/or the second base station may also be a so called femto access point (Home (e)NodeB) being assigned to a femto cell. Thereby, the connection between the user equipment and the respective base station may be established by means of a wired and/or a wireless transmission link. In particular the UE may be a cellular mobile phone, a Personal Digital Assistant (PDA), a notebook computer and/or any other movable communication device.

It has to be pointed out that the number of broadcasted synchronization signals may be associated with the number of second base stations being relevant for the first base station. In particular, each of the at least one second base station may broadcast one or more synchronization signals. As will be explained below in more detail, this synchronization signal or these synchronization signals may be received by the first base station in order to extract important information about its network surroundings.

It has to be further pointed out that activating the first base station may mean that the first base station is starting its operation at least after it had been switched off for some time. Whether or not to apply the power boost may be decided by a network element, e.g. the mentioned gateway and the decision may depend on the time the first base station has been switched off or also on other parameters in particular whether other base stations have been deployed in the vicinity during the time the first base station was switched off. Of course, the described activation of the first base station can also be effected for the first time after the first base station has been deployed or set up at a predetermined location.

According to an embodiment of the invention the step of informing the at least one second base station comprises (a) transmitting an activation information indicating the activation of the first base station from the first base station to a central network element of the cellular telecommunication network and (b) transmitting the activation information from the central network element to the at least one second base station.

Using a the central network element as an intermediate entity for forwarding the activation information from the activated first base station to the at least one second base station may provide the advantage that by contrast to a decentral transmission of the activation message the first base station only needs to transmit one single message indicating its activation respectively its onset of operation to the central network element. Subsequently, the central network element takes care of informing the at least one second base station about the activation. However, it is mentioned that of course also a decentral transmission of the activation message from the first base directly to the at least one second base station would be possible.

The central network element may be any network entity, which is connected both to the first base station and to the at least one second base station. In particular, the central network element may be a Mobile Switching Center (MSC) or a Home eNB Gateway or any network element of a core network, which is connected both to the first base station and to the at least one second base station. This network element may have knowledge of the geographic locations or at least the neighbor relations of already deployed base stations.

According to a further embodiment of the invention the step of broadcasting the synchronization signal is accomplished exclusively within predetermined time intervals. This may provide the advantage that negative interference effects, which are related to the described power boost of the synchronization signal, can be limited to small time intervals. These time intervals may be known by other network elements such as other base stations and/or in particular by user equipments being served by a base station. Therefore, these other network elements can adopt their own operation to the described power boost being limited to the predetermined time intervals, e.g. by selecting more robust modulation and coding schemes. Thereby, interference effects can be reduced significantly.

According to a further embodiment of the invention the predetermined time intervals represent a selection of time intervals, which are used for transmitting usual synchronization signals within the cellular telecommunication network. This may mean that for transmitting power boosted synchronization signals being associated with the activation of the first base station not all possible time intervals are used.

For instance the synchronization signal power boosting could be allowed within one out of N possible time intervals. In particular, the power boosting procedure could be carried out only in every 10th radio frame. Of course, if the number of time intervals for a power boosting is reduced, the overall measurement time for the first base station for scanning its network environment has to be increased accordingly.

According to a further embodiment of the invention within the predetermined time intervals no user equipments of the cellular telecommunication network are scheduled. Alternatively, the at least one second base station (131, 141) uses only a reduced transmitting power for transmitting data to user equipments (111) of the cellular telecommunication network (100).

Both described alternatives may provide the advantage that interference effects between the synchronization signal(s) and radio signals being associated with user data can be completely eliminated.

In this respect scheduling means that the time axis is divided into a plurality of time periods, which may be selectively used for radio communication between different radio network elements such as base stations, relay nodes and/or user equipments. For instance, the time axis may be divided into radio frames having a duration of e.g. 10 ms. Each radio frame may further be subdivided into subframes or time transmission intervals (TTI) each having a duration of e.g. 1 ms. Further, two successive time slots may be assigned to one subframe.

Therefore, "not scheduling" means that within the predetermined time intervals user data are not transmitted. This may hold for an uplink data transmission and/or a downlink data transmission. In particular, if the downlink user data transmission between a second base station and a served UE is restricted within the predetermined time intervals, the second base can use the (radio frequency) power, which would normally be necessary for transmitting user data via a downlink connection to a UE, for significantly increasing the power of the synchronization signal. In other words, a power boost of the synchronization signal can be realized because all or least a main portion of the transmitting power being available for the respective second base station is used for the power boosted synchronization signal(s).

At this point it is mentioned that the corresponding second base station may also be so powerful, that all power being necessary for the boosted synchronization signal(s) can be provided by the transmission unit of the second base station without taking power reserves from radio transmission resources or physical resource blocks, which are usually assigned to the transmission of user data. This may be the case if the transmission power of the second base station is reduced to a value below the maximum power capability due to other reasons, e.g. in order to save electrical power.

Furthermore it is noted that the power of the synchronization signals can even be boosted by a higher amount of power than that is saved on user data transmissions: If substantially only a single signal is transmitted, then there will be small variances in transmission power over time and the so called peak to average ratio that gives the relation between peak transmission power (during a single time instant) and average transmission power (for instance averaged over a TTI) will be reduced. Because typically the peak power is limited, not the average power due to limits in the amplifier electronics but a reduced peak to average ratio means that the average power can be increased. The peak to average power ratio may be decreased for transmission of a single signal or a few signals because if more signals are transmitted concurrently, there can be constructive or destructive superposition of the individual signals, and the constructive superposition may cause high instantaneous power.

According to a further embodiment of the invention the method further comprises broadcasting further control information by the at least one second base station within the predetermined time intervals. This may provide the advantage that fractions of time within the predetermined time intervals, which fractions of time could not be used for a transmission of user data because of the above described "not-scheduling" of user equipments, could be used for broadcasting other control information.

Corresponding control signals could be for instance a Physical Broadcast Channel (PBCH) signal, a Physical Control Format Indicator Channel (PCFICH) signal, a Packet Data Control Channel (PDCCH) signal, a Physical Hybrid Automatic Repeat Request Indicator Channel (PHICH) signal and/or a Physical Hybrid ARQ Indicator Channel (PHICH) signal.

It has to be mentioned that depending on the current operational state of the cellular telecommunication network the further broadcasting could be carried out with a normal or with an increased transmitting power.

According to a further embodiment of the invention the synchronization signal comprises a primary synchronization signal and a secondary synchronization signal. The primary synchronization signal (PSS or PSCH) may be used to synchronize timing during cell search and give some indication of the cell group indication. The secondary synchronization signal (SSS or SSCH) may be used to synchronize timing and to transmit further information on the cell group identification during cell search.

In order to realize an effective synchronization signal power boosting the first and/or the second synchronization signal may be transmitted within a frequency range, which comprises more than one subcarrier. In particular, for a Long Term Evolution (LTE) telecommunication network operating with Orthogonal Frequency Division multiplexing (OFDM), the first and/or the second synchronization signal may be transmitted within the central 72 subcarriers, which can be used by any network element being compatible with the LTE specifications. Thereby, the 72 subcarriers may occupy a frequency bandwidth of for instance 1.25 MHz.

At this point it is mentioned that the described method is applicable for both Frequency Division Duplex (FDD) and Time Division Duplex (TDD) technologies. Further, the described method could be applied also to all kind of mobile telecommunication networks other than LTE.

According to a further embodiment of the invention the method further comprises (a) receiving the synchronization signal by the first base station and (b) evaluating a scrambling code for the first base station based on the received synchronization signal. This may provide the advantage that the recently activated first base station can be able to evaluate a proper scrambling code, which scrambling code is not in conflict with neighboring and/or potentially interfering base stations. Due to the above described power boosting of the synchronization signal the first base station will receive information respectively the synchronization signal(s) also from base stations, which—with a usual transmission power—have no direct radio contact to the first base station but which at the location of a user equipment being served by the first and/or second base station may potentially interfere with the first base station.

In other words, by improving the information basis on which a proper scrambling code selection can be based on, scrambling code collisions between neighboring base stations can be effectively avoided. This also holds for the selection of a proper physical cell ID for the activated first base station, which physical cell ID should also be assigned to the first base station from the telecommunication network and/or be determined by the recently activated first base station.

Generally speaking, the described method provides a procedure which may allow for a collision free physical ID and scrambling code allocation to neighboring base stations, when a new base station is activated. The collision free physical ID and scrambling code allocation is in particular suitable for Home evolved Node Bs (H(E)NBs) which may use a wide area overlay network for establishing location relationship information.

It has to be mentioned that in order to guarantee a reliable reception of a power boosted synchronization signal it might be necessary that the first base station is equipped with a UE type receiver. In this context a UE type receiver may be any receiver, which is capable of monitoring the surrounding base station environment which is operated at the same carrier in frequency space.

According to a further embodiment of the invention (a) if the first base station is a wide area base station, a first scrambling code is evaluated for the first base station, wherein the first scrambling code belongs to a first range of scrambling codes being reserved exclusively to wide area base stations, and (b) if the first base station is a home base station, a second scrambling code is evaluated for the first base station, wherein the second scrambling code belongs to a second range of scrambling codes being reserved exclusively to home base stations.

The described exclusive assignment of home base stations and WA base stations to different codes may provide the advantage that a clash of codes for home cells and WA cells can be avoided in a reliable manner.

For instance in a LTE telecommunication network, wherein according to standard specification 504 possible scrambling codes respectively cell IDs are provided, codes up to code No. 450 could be reserved for WA base stations and the remaining codes could be reserved exclusively for home base stations. This may provide the advantage that a first base station, in particular an activated home base station, cannot compromise the performance of WA base stations in a co-channel deployment due to an incorrect code selection. Further, this may allow to configure the codes of the WA cells respectively the WA base stations independently from possibly deployed home (femto) cells respectively home (femto) base stations. Thereby, when planning a WA network environment code planning can be carried out without taking into account possibly already deployed home base stations. In that case it would be not necessary to perform a synchronization signal boosting for WA base stations but only for home base stations. This may further provide the advantage of avoiding any loss of power and capacity within the WA cells as boosting is not necessary.

According to a further embodiment of the invention (a) at least two second base stations, which are potentially interfering base stations with respect to the first base station and which are assigned to a predetermined wide area overlay cell, are informed about the activation of the first base station, and (b) the at least two second base stations respectively broadcast a synchronization signal with a temporarily increased transmitting power. This may be advantageous in particular for an activated first base station such as a femto access point and/or a (H(e)NB), which are assigned to one and the same overlaying macro cell and/or which are served by one and the same Wide Area (WA) base station.

Specifically, when the first base station is activated, all second base stations, which receive the synchronization signal from one and the same WA base station of one and the same WA overlay cell as the strongest synchronization signal, may boost their synchronization signal.

This procedure is in particular advantageous for a network environment having a light deployment of second base stations. This means that the spatial density of deployed second base stations is not too big such that the total power of all boosted synchronization signals is kept within acceptable limits in order to avoid interference problems with network elements being located far away from the activated first base station.

According to a further embodiment of the invention (a) at least one second base station of at least two second base stations, which are potentially interfering base stations with respect to the first base station, is informed about the activation of the first base station, and (b) only these second base stations broadcast their synchronization signal with a temporarily increased transmitting power, which are neighbours of one second base station of the second base stations, which one second base station has been detected by the first base station even with broadcasting its synchronization signal with a normal transmitting power.

This procedure is in particular advantageous for a spatially dense deployment of base stations, wherein a synchronization signal power boosting of all base stations within the coverage area of a particular WA base station would lead to an unacceptable strong overall boosted synchronization signal, which may potentially cause non manageable interference effects with other signals of the overall cellular telecommunication network. The one second base station neighboring the first base station may have already been detected by the first base station in the course of a previous activation procedure and/or in an initial setup procedure, which has already been completed before and this one second base station of the second base stations may be possible to detect even without boosting.

According to a further aspect of the invention there is provided a second base station for transmitting a synchronization signal within a cellular telecommunication network. The second base station comprises (a) an obtaining unit for obtaining an information from a first base station about the activation of the first base station, wherein the second base station is a potentially interfering base station with respect to the first base station, and (b) a broadcasting unit for broadcasting the synchronization signal with a temporarily increased transmitting power.

This further aspect of the invention is based on the idea that by temporarily increasing the transmitting power for a synchronization signal after a new base station (the first base station) has been activated, the spatial coverage for receiving the temporarily increased synchronization signal can be enlarged significantly. Thereby, also a base station might be able to receive the synchronization signal, which otherwise, i.e. with a usual transmitting power, would not be able to receive the synchronization signal, and which nevertheless may represent an interfering base station for a user equipment (UE), which may receive radio signals both from the first and the second base station.

The use of the temporarily increased transmitting power may mean that after the transmission of the synchronization signal has been completed the transmission of further synchronization signals will be accomplished again with a usual transmission power. The described transmission of the synchronization signal with an increased transmission power can be interpreted as a power boosting, which will of course also produce enlarged interference effects with other radio signals being transmitted within the cellular telecommunication network. However, since it is expected that an activation of a first base station will be carried out not very often within a predetermined time interval, this disadvantage can be accepted.

It has to be mentioned that the obtaining unit might be adapted to receive the information about the activation of the first base station directly and/or indirectly from the first base station. In particular, if the first and the second base station are not directly connected with each other via a radio transmission link, an intermediate network element can be used for directly receiving the activation information from the first base station and for forwarding this activation information to the obtaining unit of the second base station. This intermediate network element may be for instance a central network element of the cellular telecommunication network. The intermediate network element may be any network entity, which is connected both to the first base station and to the second base station. In particular the central network element may be a Mobile Switching Center (MSC) or a gateway or a femto gateway or any network element of a core network, which is connected both to the first base station and to the at least one second base station.

According to a further embodiment of the invention the second base station is a home base station or a wide area base station.

The home base station may be an access point serving a home cell or a so called femto cell. The home respectively the femto cell may be for instance a small cellular region within the cellular telecommunication network. The home base station serving the femto cell may also be called a femto access point. The home base station is typically located at the premises of a customer of an internet service provider, of a customer of a mobile network operator and/or of a customer of any other telecommunication service provider.

The home base station may be a low cost, small and reasonably simple unit that can connect to a Base station Controller (in a Global System for Mobile communications (GSM) network) and/or to a core network (in a Long Term Evolution (LTE) network) or to a gateway that provides connection to a core network or other networks.

By contrast to a wide area (WA) base station the home base station may be a much cheaper and in particular less powerful device. This may hold in particular for the spatial coverage. The home base station may be designed for a maximal number of users respectively a maximal number of communication devices, which maximal number is typically between 5 and 20. By contrast thereto, a WA base station may be designed for serving much more users respectively communication devices. A WA base station may serve for instance 50, 100 or even more users respectively communication devices.

A further important difference between a home base station serving a femtocell and a WA base station serving an overlay cell of a cellular telecommunication network can be seen in restricting the access of user equipments respectively communication devices. A home base station typically provides access to a closed user group and/or to predefined communication devices only. This may be achieved by a rights management system, which can be implemented in the home base station. With such a rights management system it may be prevented for instance that an unauthorized user can use a private and/or a corporate owned printer, which represents a communication device being assigned to the femtocell of the home base station. By contrast thereto, a WA base station provides an unlimited access for user equipments provided that the user of the respective user equipment has a general contract with the operator of the corresponding mobile telecommunication network or at least with an operator, which itself has a basic agreement with the operator of the WA base station.

According to a further aspect of the invention there is provided a central network element of a cellular telecommunication network. The provided central network element comprises (a) a unit for receiving an activation information from a first base station of the cellular telecommunication network and (b) a unit for transmitting a boosting informing to at least one second base station, which is a potentially interfering base station with respect to the first base station, about the activation of the first base station (121). Thereby, the boosting information is adapted to prompt the at least one second base station to broadcast a synchronization signal with a temporarily increased transmitting power.

The described central network element is based on the idea that it can be used first for collecting an activation information and second for forwarding this activation information by means of the described boosting information to the at least one second base station. This may provide the advantage that by contrast to a decentral transmission of the activation message the first base station only needs to transmit one single message indicating its activation respectively its onset of operation to the central network element.

The central network element may be any network entity, which is connected both to the first base station and to the at least one second base station. In particular, the central network element may be a Mobile Switching Center (MSC) or a Home eNB Gateway or any network element of a core network, which is connected both to the first base station and to the at least one second base station. This network element may have knowledge of the geographic locations or at least the neighbor relations of already deployed base stations.

At this point it is mentioned that it might also be possible that simultaneously at least two different (first) base stations are activated within the same cell of the cellular telecommunication network. In this case the central node may take care that first a first one of the activated first base stations selects a physical cell ID. This ID can then be transmitted by means of a synchronization signal having a normal or a temporarily increased transmitting power to the other activated first base station, which can then avoid this ID when selecting another proper physical cell ID.

Further, it may also be possible that the at least two activated first base stations listen simultaneously for boosted synchronization signals, which are originating from other old base stations, which have already been activated and which have already selected a proper physical cell ID before. In this case both recently activated base stations get information about the physical cell ID assignment of the already existing radio network environment. Thereafter, a first one of the recently activated base stations may transmit a synchronization signal in particular to the second one of the recently activated base stations, which thereby gets knowledge about the physical cell ID which has been selected by the first recently activated base station. As a consequence, the second one of the recently activated base stations can select a proper physical cell ID in accordance with the radio network environment represented by the other old base stations and the first one of the recently activated base stations. This may provide the advantage that it is sufficient if the old base station only transmits its synchronization signals once. Further, if the activation is not critical in terms of time, it may be possible to wait with a physical cell ID assignment for a first first base station until a second first base station has been activated. Of course, if the time span between the activation of the two first base stations has exceeded a reference time span, the physical cell ID assignment for the first first base station can be accomplished independently from the activation of the second first base station.

As an alternative it may also be possible to organize the whole physical cell ID assignment for both activated first base stations via the above described central network element. Thereby, both activated first base stations may quasi simultaneously select a physical cell ID. Of course, if later it turns out that there is a collision between the two selected physical cell IDs, i.e. both have selected the same ID, at least one of the two activated first base stations has to select a new different physical cell ID. This may provide the advantage that the physical cell ID selection after activation can be carried out in parallel instead of a serial procedure. In most application cases, which do not comprise a physical cell ID collision, the described parallel selection of physical cell IDs will be much faster than a serial selection of appropriate physical cell IDs.

According to a further aspect of the invention there is provided a program element for transmitting a synchronization signal within a cellular telecommunication network. The program element, when being executed by a data processor, is adapted for controlling the above described synchronization signal transmitting method.

As used herein, reference to a program element is intended to be equivalent to a reference to a complete computer program and/or to a computer readable medium containing instructions for controlling a computer system to coordinate the performance of the above described method.

The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program may be available from a network, such as the WorldWideWeb, from which it may be downloaded.

The described invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
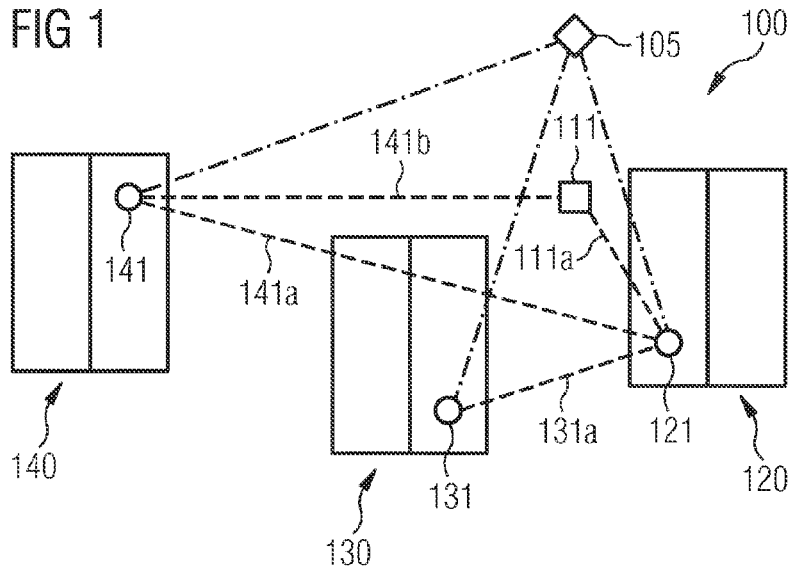
FIG. 1 shows a cellular telecommunication network comprising one first base station, which is supposed to be set up and two second base stations, which are already in full operation.

The illustration in the drawing is schematically.

FIG. 1 shows a cellular telecommunication network 100 comprising one first base station 121 and two second base stations 131 and 141. The first base station 121 represents a base station which has just been activated.

According to the embodiment described here all base stations 121, 131 and 141 are connected to a central network element 105. The central network (105) element may be a Mobile Switching Center (MSC) or for instance a Home eNB Gateway. Upon activation of the first base station 121 the central network (105) may inform the second base stations 131 and 141 about the activation of the first base station 121.

In order to provide for a collision free allocation of a physical ID, which typically comprises a one to one relationship with a scrambling code, it has to be clear what physical IDs have already been assigned to the two second base stations 131 and 141. It has to be mentioned that in reality often more than two second base stations are present within the neighborhood of the first base station 121.

According to the embodiment described here all base stations are home base stations. In the framework of Long Term Evolution (LTE) networks a home base station is denominated home evolved NodeB (HeNB).

In order to find out what physical IDs have already been used for the two second base stations the just activated first base station 121 can listen to synchronization signals, which according to the LTE standard specifications are periodically transmitted by the second base stations 131 and 141. Based on these synchronization signals, the first base station 121 can evaluate for itself an appropriate physical ID or an appropriate scrambling code, which is not in conflict with the physical IDs respectively the scrambling codes of the second base stations 131 and 141.

If the first base station 121 and also other base stations are capable of performing such a procedure, wherein they assign themselves an appropriate physical ID respectively an appropriate scrambling code just after having been activated, the telecommunication network represents a Self Optimizing Network (SON), which is capable of organizing itself with respect to the allocation of physical IDs respectively scrambling codes used for digital radio communication with user equipments.

In most situations the above described autonomous allocation procedure of physical IDs respectively scrambling codes works fine. However, there are also cases in which the above described procedure may lead to a collision of scrambling codes between the first base station and one neighboring second base station. Such a situation is depicted in FIG. 1. Thereby, the first home base station 121 is located in a first building 120, the second home base station 131 is located in a second building 130 and the third home base station 141 is located in a third building 140. In FIG. 1 each building 120, 130 and 140 is illustrated by walls, wherein each wall causes at least some attenuation of radio signals, which may be transmitted between the various base stations 121, 131, 141.

As can be seen in FIG. 1, the first base station 121 is capable of receiving reliable signals from the second base station 131. The corresponding radio link 131a extends only across two walls, one wall being assigned to the building 130 and one wall being assigned to the building 120.

By contrast thereto, the first base station 121 is not able to receive reliable signals from the further second base station 141. The corresponding radio link 141a extends across five walls each contributing to a significant attenuation of radio signals. One wall is assigned to the building 140, altogether three walls are assigned to the building 130 and one wall is assigned to the building 130.

In other words, the base station 121 probably does not detect synchronization signals being transmitted from the second base station 141 due to the illustrated double wall isolation and the corresponding shadowing of the building 130. However, a user equipment (UE) 111, which is connected to the first base station 121 via a radio link 111a and which is currently located outside the building 120 would receive the synchronization signals from the second base station 141 via a radio link 141b quite well. Therefore, when allocating an appropriate physical ID respectively an appropriate scrambling code for the first base station 121, the first base station 121 probably would only consider the allocated scrambling code of the further second base station 131 and would not consider the scrambling code used by the second base station 141 as an already reserved code. Therefore, it is not unlikely that a code collision could occur.

According to the embodiment of the method described in this application the probability to run into code collision problems during an initial setup phase of the first base station 121 will be significantly reduced by temporarily increasing the transmitting power of the synchronization signals transmitted by the second base stations 131 and 141. On the time scale this power boosting is associated with an activation procedure of the first base station 121. Therefore, preferably the power boosting may be carried out only if a new base station, i.e. the first base station 121, has to be integrated in a collision free manner into the already existing cellular telecommunication network 100.

Due to the described power boosting there is at least a certain probability that the first base station 121 might be able to receive the synchronization signals from the second base station 141, which otherwise, i.e. with a usual transmitting power, would not be able to receive the corresponding synchronization signals.

It has to be pointed out that even if the first base station 121 is not able to receive normal synchronization signals from the second base station 141, at the location of the UE 111 the second base station 141 might be an interfering base station. Therefore, in order to avoid data collisions the first base station 121 and both the second base station 131 and the second base station 141 must have different physical IDs respectively must use different scrambling codes.

In other words, the second base station 141 may represent an interfering base station for the UE 111, which in the future will be served by the first base station 121, which is located closer to the UE 111 being located in a yard of the building 120. Such a situation can appear for instance if (a) the UE has a good radio connection with both the activated first base station 121 and the second base station 141 and (b) there is no or only a very bad radio connection between the first base station 121 and the second base station 141. This can be the case for instance if there are any attenuating barriers between the first base station 121 and the second base station 141. Due to the temporarily increased transmission power the synchronization signal may penetrate such barriers such as house walls or other elements which at least partially attenuate radio signals.

With the described power boost and, if necessary, doing some averaging during a corresponding measurement procedure, the first base station 121 may be able to detect synchronization signals received even from the base station 141. Therefore, there is at least a higher likelihood that potentially interfering base stations can detect each other.

Figure 2:
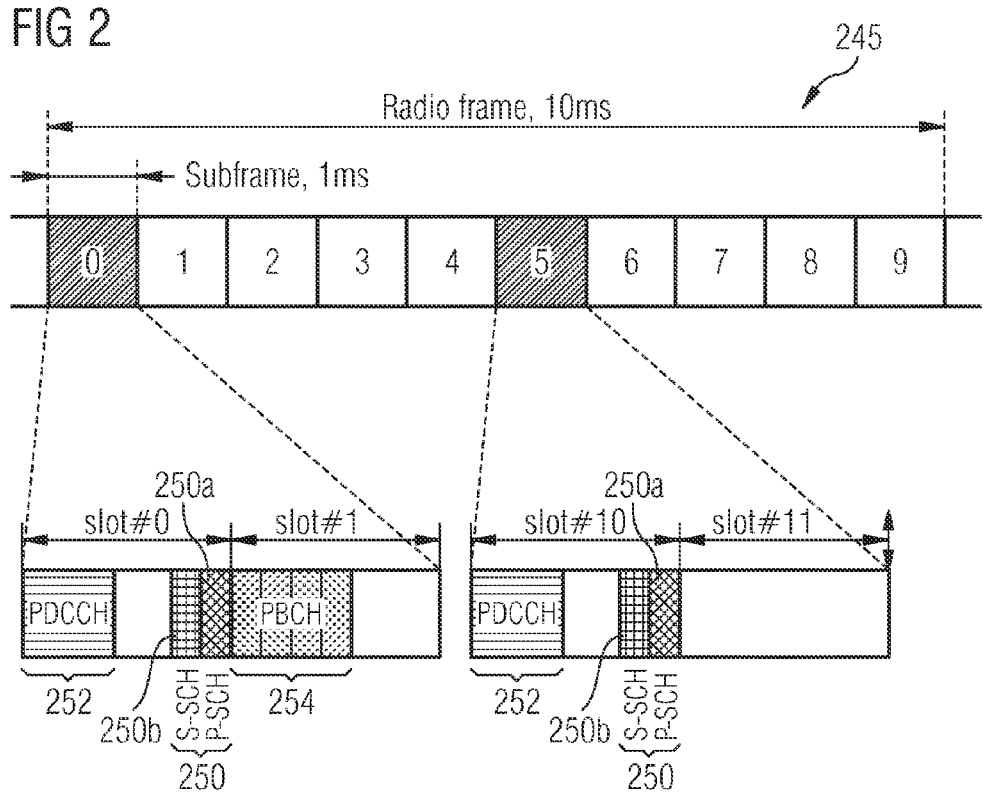
FIG. 2 shows a time allocation diagram of a power boosted synchronization signal within a radio frame as defined by the standard specification for Long Term Evolution networks.

FIG. 2 shows a time allocation diagram 245 illustrating a currently preferred embodiment of the invention. The diagram 245 shows a radio frame, which according to current LTE standard specifications has a duration of 10 ms. Each radio frame is further subdivided into subframes or time transmission intervals (TTI), each having a duration of 1 ms. Further, two successive time slots may be assigned to one subframe. As a consequence, a slot #0 and a slot #1 are assigned to the first subframe 0. A slot #10 and a slot #11 are assigned to the sixth subframe 5.

According to the embodiment described here in these subframes, where currently according to the LTE standard a synchronization signal 250 comprising a primary synchronization signal (P-SCH) 250a and a secondary synchronization signal (S-SCH) 250b is transmitted, no users are scheduled in downlink. Therefore, the overall available transmitting power of the second base stations 131 and 141 will be concentrated on the sub-carriers used for the P-SCH 250a and the S-SCH 250b.

Assuming a LTE telecommunication system with a 10 MHz overall bandwidth, with this approach a primary synchronization signal power boost and a secondary synchronization signal power boost of approximately 9.2 dB can be achieved. Note that in the Physical Resource Blocks (PRB) for a radio data transmission, wherein the primary synchronization signal 250a and the secondary synchronization signal 250b are transmitted, there are anyhow no reference symbols transmitted during those times. Therefore, no additional signal being associated to user data is needed to be inherently transmitted there.

In this context it is pointed out that for transmitting data via a radio link an appropriate data transmission resource has to be provided. Typically, the overall data transmission resource is subdivided in minimum transmission resource units for the data transfer. This minimum unit may be called a Physical Resource Block (PRB), a chunk, a slot and/or a frame. The minimum unit may be illustrated as a two-dimensional element within a coordinate system having a time axis and a frequency axis.

According to the preferred embodiment described here further control signals 252 are exclusively transmitted in the first up to three symbols each representing the smallest amount of data which can be transmitted at a time in a digital communication. These three signals may comprise a Physical Control Format Indicator Channel (PCFICH) signal, a Packet Data Control Channel (PDCCH) signal and/or a Physical Hybrid Automatic Repeat Request Indicator Channel (PH-ICH) signal.

Further, as can be seen from FIG. 2 another control signal 254 may be transmitted by the respective second base station in the first symbols being assigned to the slot #1 of the first subframe 0. This other control signal 254 can be for instance a Physical Broadcast Channel (PBCH) signal, which provides further elemental information about the respective second base station respectively about the cell being served by the respective base station. Of course, a corresponding transmission of this another control signal could be carried out also in the slot #11 being assigned to the sixth subframe 5.

According to a further embodiment of the described synchronization signal power boost procedure, the power boosting of the primary synchronization signal 250a and the secondary synchronization signal 250b is carried out only in the subframe 0, but not in the subframe 5. This embodiment is based on the idea that if it is known how to reserve boosting power from other frequencies, then this reserved power can also be used for symbols with which a PBCH signal is transmitted. This may mean that there is no additional power loss when boosting the PBCH signal as well. The boosting of the PBCH then allows to also decode the PBCH in these scenarios in a more reliable way. With the help of the boosted PBCH it may be possible for the first base station 121 to confirm the detection of the secondary synchronization signal 250b and the primary synchronization signal 250a.

Alternatively, if the PBCH is not supposed to be boosted, it may be better to only boost the synchronization signals 250b and 250a within the subframe 5, but not in the subframe 0. Then the power which will be available in subframe 5 can be used to boost the data that are transmitted in the other symbols in subframe 5. These symbols are illustrated with a free white rectangle in FIG. 2. In subframe 5 there are available more data symbols, because no symbols are reserved for PBCH signals. As a consequence, more data can be boosted allowing the use of a higher modulation coding scheme. This in turn allows for a higher data throughput.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 cellular telecommunication network
105 central network element/Mobile Switching Center/Home eNB Gateway
111 User Equipment (UE)
111a radio link
120 building
121 first base station/first H(e)NB
130 building
131 second base station/second H(e)NB
131a radio link
140 building
141 third base station/third H(e)NB
141a radio link
141b radio link
245 time allocation diagram
250 synchronization signal
250a primary synchronization signal (PSS or P-SCH)
250b secondary synchronization signal (SSS or S-SCH)
252 further control signal
254 further control signal

The invention claimed is:

1. Method for transmitting a synchronization signal within a cellular telecommunication network, the method comprising activating a first base station of the cellular telecommunication network, informing at least one second base station, which is a potentially interfering base station with respect to the first base station, about the activation of the first base station, and broadcasting the synchronization signal by the at least one second base station with a temporarily increased transmitting power, wherein the broadcasting the synchronization signal is performed in response to activating the first base station.

2. The method as set forth in claim 1, wherein informing the at least one second base station comprises
transmitting an activation information indicating the activation of the first base station from the first base station to a central network element of the cellular telecommunication network and
transmitting the activation information from the central network element to the at least one second base station.

3. The method as set forth in claim 1, wherein broadcasting the synchronization signal is accomplished exclusively within predetermined time intervals.

4. The method as set forth in claim 3, wherein the predetermined time intervals represent a selection of time intervals, which are used for transmitting usual synchronization signals within the cellular telecommunication network.

5. The method as set forth in claim 3, wherein within the predetermined time intervals
no user equipments of the cellular telecommunication network are scheduled or
the at least one second base station uses only a reduced transmitting power for transmitting data to user equipments of the cellular telecommunication network.

6. The method as set forth in claim 1, further comprising broadcasting further control information by the at least one second base station within the predetermined time intervals.

7. The method as set forth in claim 1, wherein the synchronization signal comprises
a primary synchronization signal and
a secondary synchronization signal.

8. The method as set forth in claim 1, further comprising
receiving the synchronization signal by the first base station and
evaluating a scrambling code for the first base station based on the received synchronization signal.

9. The method as set forth in claim 1, wherein
if the first base station is a wide area base station,
a first scrambling code is evaluated for the first base station, wherein
the first scrambling code belongs to a first range of scrambling codes being reserved exclusively to wide area base stations, and
if the first base station is a home base station, a second scrambling code is evaluated for the first base station, wherein
the second scrambling code belongs to a second range of scrambling codes being reserved exclusively to home base stations.

10. The method as set forth in claim 1, wherein
at least two second base stations, which are potentially interfering base stations with respect to the first base station and which are assigned to a predetermined wide area overlay cell, are informed about the activation of the first base station, and
the at least two second base stations respectively broadcast a synchronization signal with a temporarily increased transmitting power.

11. The method as set forth in claim 1, wherein
at least one second base station of at least two second base stations, which are potentially interfering base stations with respect to the first base station, is informed about the activation of the first base station, and
only these second base stations broadcast their synchronization signal with a temporarily increased transmitting power, which are neighbours of one second base station of the second base stations, which one second base station has been detected by the first base station even with broadcasting its synchronization signal with a normal transmitting power.

12. A second base station for transmitting a synchronization signal within a cellular telecommunication network, the second base station comprising: an obtaining unit for obtaining an information from a first base station about the activation of the first base station, wherein the second base station is a potentially interfering base station with respect to the first base station, and a broadcasting unit for broadcasting the synchronization signal with a temporarily increased transmitting power in response to obtaining the information from the first base station.

13. The second base station as set forth in claim 12, wherein the second base station is a home base station or a wide area base station.

14. A central network element of a cellular telecommunication network, the central network element comprising: a unit for receiving an activation information from a first base station of the of the cellular telecommunication network, a unit responsive to receiving the activation information for transmitting a boosting informing to at least one second base station, which is a potentially interfering base station with respect to the first base station, about the activation of the first base station, wherein the boosting information is adapted to prompt the at least one second base station to broadcast a synchronization signal with a temporarily increased transmitting power.

15. A program element stored on a non-transitory computer readable medium for transmitting a synchronization within a cellular telecommunication network, the program element, when being executed by a data processor, is adapted for controlling the method as set forth in claim 1.

* * * * *

UNITED STATES PATENT AND TRADEMARK OFFICE
CERTIFICATE OF CORRECTION

| | | |
|---|---|---|
| PATENT NO. | : 8,565,807 B2 | Page 1 of 1 |
| APPLICATION NO. | : 13/058600 | |
| DATED | : October 22, 2013 | |
| INVENTOR(S) | : Juergen Michel, Bernhard Raaf and Alexander Vesely | |

It is certified that error appears in the above-identified patent and that said Letters Patent is hereby corrected as shown below:

IN THE CLAIMS:

In Claim 14, Column 17, line 7, delete "of the" preceding the word "cellular".

Signed and Sealed this
Seventeenth Day of December, 2013

Margaret A. Focarino
*Commissioner for Patents of the United States Patent and Trademark Office*